United States Patent
Arbitmann et al.

(10) Patent No.: US 8,209,090 B2
(45) Date of Patent: Jun. 26, 2012

(54) METHOD AND DEVICE FOR PERFORMING A COLLISION AVOIDANCE MANEUVER

(75) Inventors: Maxim Arbitmann, Rochester Hills, MI (US); Ulrich Stählin, Eschhorn (DE); Matthias Schorn, Mühltal (DE); Rolf Isermann, Seeheim (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 1111 days.

(21) Appl. No.: 12/047,467

(22) Filed: Mar. 13, 2008

(65) Prior Publication Data

US 2008/0208408 A1   Aug. 28, 2008

Related U.S. Application Data

(63) Continuation-in-part of application No. PCT/EP2006/066423, filed on Sep. 15, 2006.

(30) Foreign Application Priority Data

| Sep. 15, 2005 | (DE) | 10 2005 044 199 |
| Sep. 15, 2005 | (DE) | 10 2005 044 200 |
| Sep. 15, 2005 | (DE) | 10 2005 044 204 |
| Jan. 27, 2006 | (DE) | 10 2006 004 174 |
| Jul. 21, 2006 | (DE) | 10 2006 034 254 |
| Jul. 21, 2006 | (DE) | 10 2006 034 255 |
| Aug. 2, 2006  | (DE) | 10 2006 036 363 |

(51) Int. Cl.
  *B62D 6/00* (2006.01)
  *G08G 1/16* (2006.01)
  *G08G 9/02* (2006.01)

(52) U.S. Cl. ............... 701/41; 701/300; 701/301

(58) Field of Classification Search ........... 701/301, 701/41, 96, 93, 43, 44, 300, 302; 180/167, 180/271, 6.2, 6.24; 340/435, 438
See application file for complete search history.

(56) References Cited

U.S. PATENT DOCUMENTS

| 5,541,590 | A  | * | 7/1996  | Nishio ............... 340/903 |
| 6,138,062 | A  | * | 10/2000 | Usami ............... 701/23 |
| 7,243,026 | B2 | * | 7/2007  | Kudo ............... 701/301 |
| 7,778,753 | B2 | * | 8/2010  | Fujiwara et al. ...... 701/41 |
| 2004/0030498 | A1 |   | 2/2004  | Knoop et al. |
| 2004/0090117 | A1 | * | 5/2004  | Dudeck et al. ........ 303/191 |
| 2004/0193374 | A1 |   | 9/2004  | Hac et al. |
| 2005/0267683 | A1 | * | 12/2005 | Fujiwara et al. ....... 701/301 |

FOREIGN PATENT DOCUMENTS

| DE | 10012737 | 9/2001 |
| EP | 0582236  | 2/1994 |

OTHER PUBLICATIONS

Godbole et al., "Longitudinal Control of the Lead Car of a Platoon" Institute of Transportation Studies University of California, Berkley Path Technical Memorandum 93-7, Nov. 1993, pp. 1-15.*

* cited by examiner

*Primary Examiner* — Thomas G. Black
*Assistant Examiner* — Christine Behncke

(57) ABSTRACT

Disclosed is a method of executing a collision avoidance maneuver ahead of an object in the surroundings, with which the vehicle is on a collision course. To allow determining the avoiding path in a simplest possible fashion and, in particular, a simplest possible parameterization of the path, the avoiding path is given by a sigmoid ($f_{a_o}(x); f_{a_o/2}(x); f_{2a_o}(x)$), the shape of which is defined by at least one parameter (a; B; c) that is determined depending on the speed of the motor vehicle or a desired maneuver width of the collision avoidance maneuver. Also disclosed is a device which is suitable for implementing the method.

7 Claims, 4 Drawing Sheets

METHOD AND DEVICE FOR PERFORMING A COLLISION AVOIDANCE MANEUVER

PRIORITY

This application is a continuation-in-part of PCT/EP2006/066423

BACKGROUND OF THE INVENTION

The present invention relates to a method for performing a collision avoidance maneuver of a motor vehicle. Furthermore, the invention relates to a device for performing a collision avoidance maneuver of a motor vehicle which is suitable for implementing the method.

One objective in the development of motor vehicles is related to driver assistance systems for the avoidance of accidents. These systems monitor the surroundings of the vehicle, decide whether a collision with an object is likely to occur and intervene into the steering system or the brake system of the vehicle in order to prevent the accident by avoiding or braking. It has been found out that collision avoidance maneuvers, especially at high vehicle speeds, offer advantages vis-à-vis emergency stops. To execute a collision avoidance maneuver, usually an avoiding path for the vehicle is predefined in an imminent collision. A steering actuator which is controlled by a path follower controller is used to influence the steering system of the vehicle in such a way that the vehicle follows the calculated avoiding path. In this case, the steering actuator can be used to set a steering angle at the steerable wheels of the vehicle, e.g. independently of the driver's specifications, so that the collision avoidance maneuver is performed automatically without intervention of the driver.

SUMMARY OF THE INVENTION

In view of the above, an object of the invention is to allow collision avoidance on a path which can be calculated as simply as possible and, in particular, can be parameterized as simply as possible.

According to the invention, this object is achieved by a method for executing a collision avoidance maneuver of a motor vehicle and a device for executing a collision avoidance maneuver of a motor vehicle.

Accordingly, it is provided that a method of the type referred to hereinabove is implemented with the following steps:
  detecting an object in the surroundings of the vehicle with which the motor vehicle is on a collision course,
  determining a path for the collision avoidance maneuver of the motor vehicle, in which case the path is given by a sigmoid, the shape of which is determined by at least one parameter, with the parameter being established depending on the speed of the motor vehicle and/or a desired maneuver width of the collision avoidance maneuver,
  determining a start point at which the collision avoidance maneuver is started, depending on the path established, and
  influencing a steering system of the motor vehicle depending on the path established after the motor vehicle has reached the start point.

It is furthermore arranged that a device of the type initially referred to comprises the following arrangements:
  an ambience detection arrangement allowing detection of at least one object in the surroundings of the motor vehicle, and an evaluation device allowing determination of the relative position and speed of the object with respect to the motor vehicle,
  a decision arrangement used to take a decision that an avoiding maneuver of the motor vehicle is required due to a collision course with the object,
  a path presetting arrangement allowing determination of a path for the avoiding maneuver of the motor vehicle ahead of the obstacle, in which case the path is given by a sigmoid, the shape of which is defined by at least one parameter, and the parameter can be established depending on the speed of the motor vehicle and/or a desired maneuver width of the collision avoidance maneuver,
  a release arrangement that is used to determine a start point depending on the preset path established, when the collision avoidance maneuver should be started to avoid the object, and
  a controlling arrangement by which a steering actuator is controllable depending on the preset path.

Advantageously, the path for the collision avoidance maneuver is given by a sigmoid according to the invention. A sigmoid or a sigmoid function in this case shall imply in the usual sense a roughly S-shaped, real, constantly differentiable, monotonous and limited function with a reversing point. Examples for this are functions in the shape of a hyperbolic tangent function $f(x)=\alpha \tan h(\beta(x-\gamma))$, a logistic function $f(x)=\alpha/(1+\exp(-\beta(x-\gamma))$ or an arc tangent function $f(x)=\alpha \arctan(\beta(x-\gamma))$ with parameters $\alpha,\beta,\gamma$. By way of functions of this type, it is possible to configure the avoiding path in a coherent form without requiring a sectionwise definition of different arc portions, for example. Furthermore, it has shown that parameters, which determine the shape of the sigmoid, can be determined in a simple and efficient manner. In particular, a few conditions render it possible to determine a comfortable and short avoiding path, which is in conformity with requirements related to physical driving conditions.

Due to the shape of the avoiding path the vehicle is offset in the collision avoidance maneuver roughly in parallel in a transverse direction with regard to the original driving direction. The term 'maneuver width' refers to the distance of the lateral offset.

In an embodiment of the method and the device it is arranged that a parameter determining a gradient of the sigmoid is determined depending on the speed of the motor vehicle in such a fashion that a lateral acceleration of the motor vehicle which occurs in the collision avoidance maneuver does not exceed a predetermined maximum value.

As a result, the lateral acceleration can be limited to values which are in particular possible according to physical driving conditions and do not excessively stress the occupants of the vehicle. The gradient of the sigmoid implies the gradient of a tangent line to the sigmoid in the usual sense.

Another embodiment of the method and the device provides that the parameter determining the gradient of the sigmoid is determined depending on the speed of the motor vehicle in such a manner that a maximum lateral jerk that occurs in the avoiding maneuver does not exceed a predetermined maximum value.

The term 'lateral jerk' implies in this case the rate of change of the lateral acceleration. A limitation of this type in particular allows taking into consideration the realizable regulating speeds in the steering system.

An improvement of the method and the device comprises that the sigmoid is given by $$y(x) = \frac{B}{1 + \exp(-a \cdot (x - c))}$$

where y(x) is a lateral offset of the motor vehicle and x is a distance in a longitudinal direction in a system of coordinates, the origin of which is basically identical with the start point of the collision avoidance maneuver and the positive x-direction of which points in the vehicle's longitudinal direction that prevails at the start point, in which case a is the parameter determining the gradient of the sigmoid, and B and c are additional parameters which determine the shape of the sigmoid.

A sigmoid of this type has proven favorable with respect to the curve length of the avoiding path. With regard to the position of the origin of the system of coordinates with respect to the start point of the collision avoidance maneuver, there can be especially deviations due to a tolerance, which are due to the fact that the sigmoid does not extend precisely through the origin.

Another embodiment of the method and the device implies that $$B = D$$
$$c = \frac{1}{a}\ln\left(\frac{D}{y_{tol}} - 1\right)$$

holds for the parameters in an avoiding maneuver to the left in the vehicle's longitudinal direction, where D is the maneuver width of the collision avoidance maneuver and $y_{tol}$ designates a predetermined tolerance.

Furthermore, an embodiment of the method and the device is characterized in that in an avoiding maneuver to the right in the vehicle's longitudinal direction, $$B = -D$$
$$c = \frac{1}{a}\ln\left(\frac{D}{y_{tol}} - 1\right)$$

holds for the parameter, where D designates the maneuver width of the collision avoidance maneuver and $y_{tol}$ is a predetermined tolerance.

An embodiment of the method and the device furthermore provides that the maneuver width is found out depending on the width of the front of an object facing the motor vehicle.

This allows determining the 'optimum' lateral offset in the avoiding maneuver so that the maneuver width exactly corresponds to the lateral offset required for avoidance.

In another embodiment of the method and the device, the maneuver width is determined in such a manner that the motor vehicle is steered in a collision avoidance maneuver from a present lane into the middle of an adjacent lane.

The particular advantage of this strategy is that the collision avoidance maneuver is easy to reconstruct for the driver of the vehicle.

In addition, a computer program product is made available which defines an algorithm comprising a method of the type illustrated hereinabove.

The invention includes the idea of predefining the path for the collision avoidance maneuver as a defined function in a coherent form. A sigmoid has proved especially favorable in view of the length of the path and, thus, the time required for the collision avoidance maneuver as well as with respect to the parameterization ability. The sigmoid can be fixed in a suitable manner by way of a few secondary conditions.

These and other aspects of the invention are illustrated in detail by way of the embodiments and are described with respect to the embodiments in the following, making reference to the Figures.

DETAILED DESCRIPTION OF THE DRAWINGS

Figure 1:
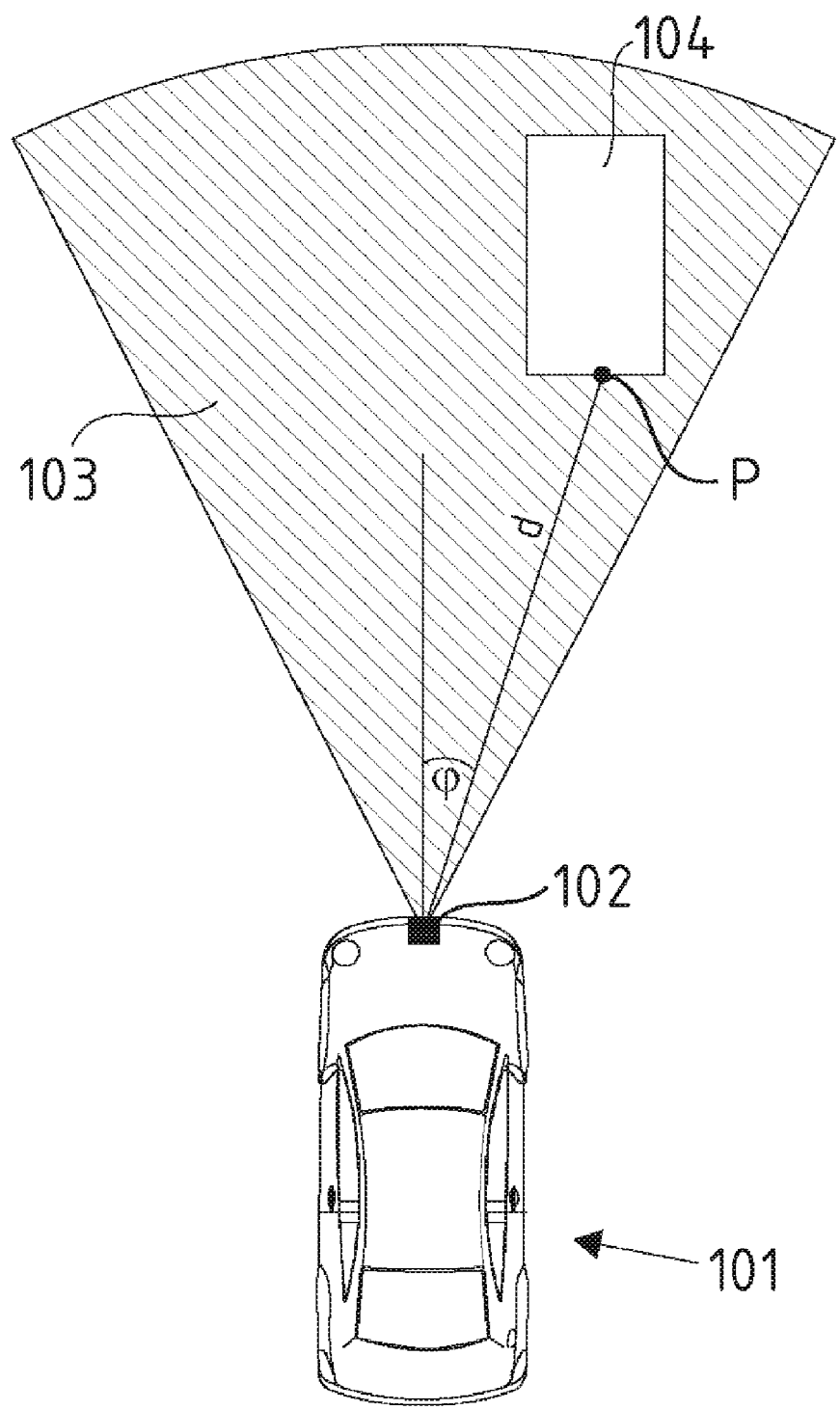
FIG. 1 is a schematic representation of a vehicle with an ambient sensor for detecting objects in the surroundings of the vehicle.
Figure 2:
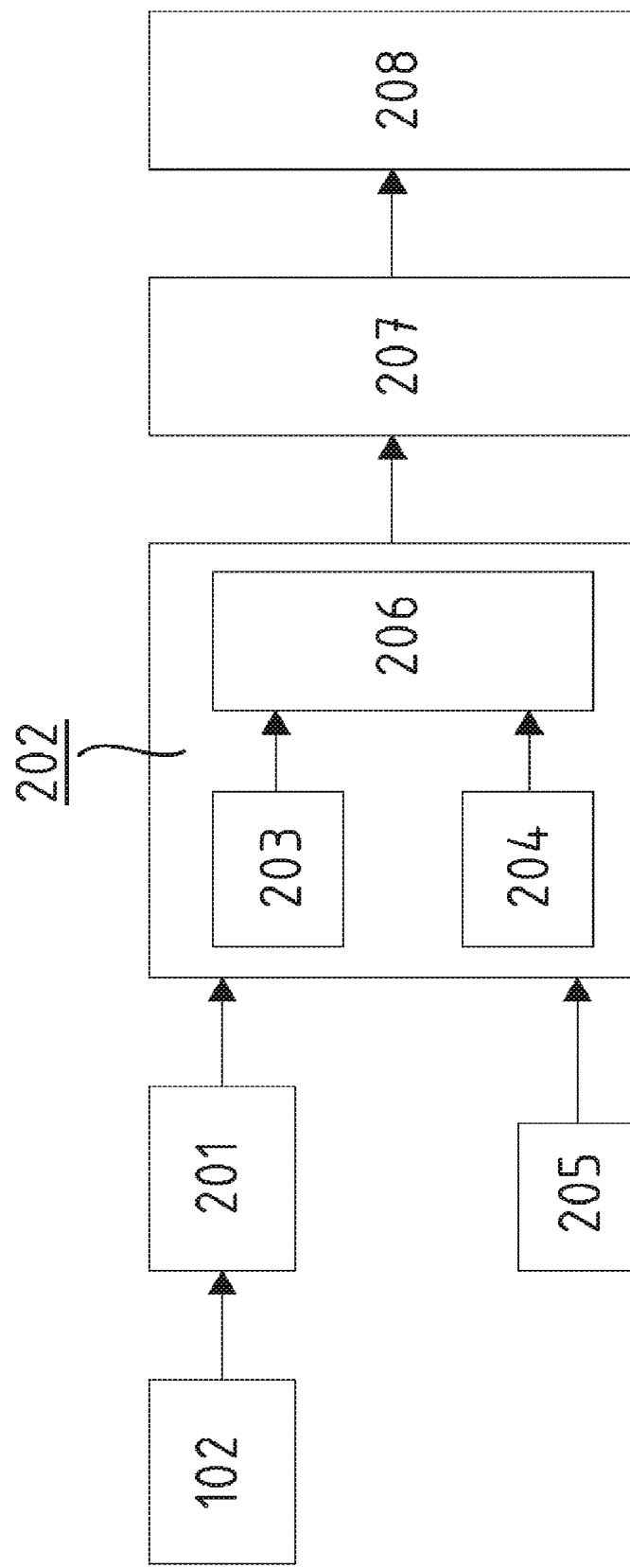
FIG. 2 is a schematic block diagram of a driver assistance system for performing a collision avoidance maneuver to avoid a collision with an object.

Illustrated in FIG. 1 by way of example is a four-wheel, two-axle motor vehicle 101 that has an ambient sensor 102, with the aid of which it is possible to detect in the surroundings of the vehicle 101 objects that are, in particular, further motor vehicles which are moving in the same driving lane or in an adjacent one laterally and/or in front of the vehicle 101. Shown by way of example is an ambient sensor 102 with a coverage 103 that comprises a solid angle ahead of the vehicle 101 in which, for example, an object 104 is illustrated. The ambient sensor 102 is preferably a LIDAR (Light Detection and Ranging) sensor that is known per se to the person skilled in the art; equally, however, it is also possible to use other ambient sensors. The sensor measures the distances d from the detected points of an object and the angles φ between the connecting straight lines to these points and the central longitudinal axis of the vehicle, as is illustrated in FIG. 1 by way of example for a point P of the object 104. The fronts of the detected objects, which face the vehicle 101, are composed of a number of detected points, in which case an object detection unit 201 that is shown in FIG. 2 and to which the sensor signals are transmitted produces the correlations between points and the shape of an object, and determines a reference point for the object. By way of example, it is possible in this case for the reference point to be selected as the midpoint of the object or the midpoint of the detected points of the object. The speeds of the detected points, and thus the speed of the detected objects, cannot be directly measured by means of the ambient sensor 102. They are calculated from the difference between the distances, measured in successive time steps, in the object detection unit 201 of clockwise operation. In a similar way, it is also possible in principle to determine the acceleration of the objects by two-fold derivation of their position.

FIG. 2 is a schematic view of a driver assistance system, the components of which with the exception of sensors and actuators are preferably designed as software modules, which represent a microprocessor in the vehicle 101. As FIG. 2 shows, the object data is transmitted in the shape of electronic signals within the schematically illustrated driver assistance system to a decision arrangement 202. In the decision arrangement 202, an object trajectory is defined in block 203 based on the information about the object. Furthermore, a trajectory of the vehicle 101 is determined in block 204 based on information about the driving dynamics condition of the vehicle 101, the information being found out with the aid of additional vehicle sensors 205. In particular, the vehicle speed which can be detected e.g. by means of wheel rotational speed sensors, the steering angle at the steerable wheels of the vehicle 101 that is measured by means of a steering angle sensor, the yaw rate and/or the lateral acceleration of the vehicle 101 which are measured using corresponding sensors are taken into consideration. Subsequently, a check is made in the decision arrangement 202 inside block 206 whether the vehicle 101 is on a course of collision with one of the detected objects 104. In case a like collision course is identified and the time to collision (TTC, Time To Collision) that is determined likewise in the decision arrangement 202, i.e. the duration until the determined collision with the object 104, falls below a defined value, a release signal is sent to a path presetting arrangement 207. The release signal causes an avoiding path y(x) to be initially calculated within the path presetting arrangement. Thereafter, the determined avoiding path is used to set a start point for the collision avoidance maneuver at which the collision avoidance maneuver must be started in order to be still able to avoid the object 104. These steps are repeated preferably in time steps until the risk of collision no longer exists due to changes of the course of the object 104 or the vehicle 101, or until the vehicle 101 reaches the start point for a collision avoidance maneuver. If this is the case, the avoiding path or parameters representing this path are submitted to a steering actuator control 208. Said control will then drive a steering actuator in a first preferred embodiment in such a fashion that steering angles are set at the steerable wheels of the motor vehicle which make the motor vehicle follow the avoiding path. The steering actuator in this embodiment is e.g. configured as a per se known overriding steering system which allows setting a steering angle at the front wheels of the motor vehicle 101 independently of the driver. In another embodiment, the steering actuator is used to apply a steering torque to a steering handle manipulated by the driver according to the calculated path, with the result that the driver is given a steering recommendation for a collision avoiding maneuver. In this embodiment, an electronic servo steering system can be used as a steering actuator, for example.

Figure 3:
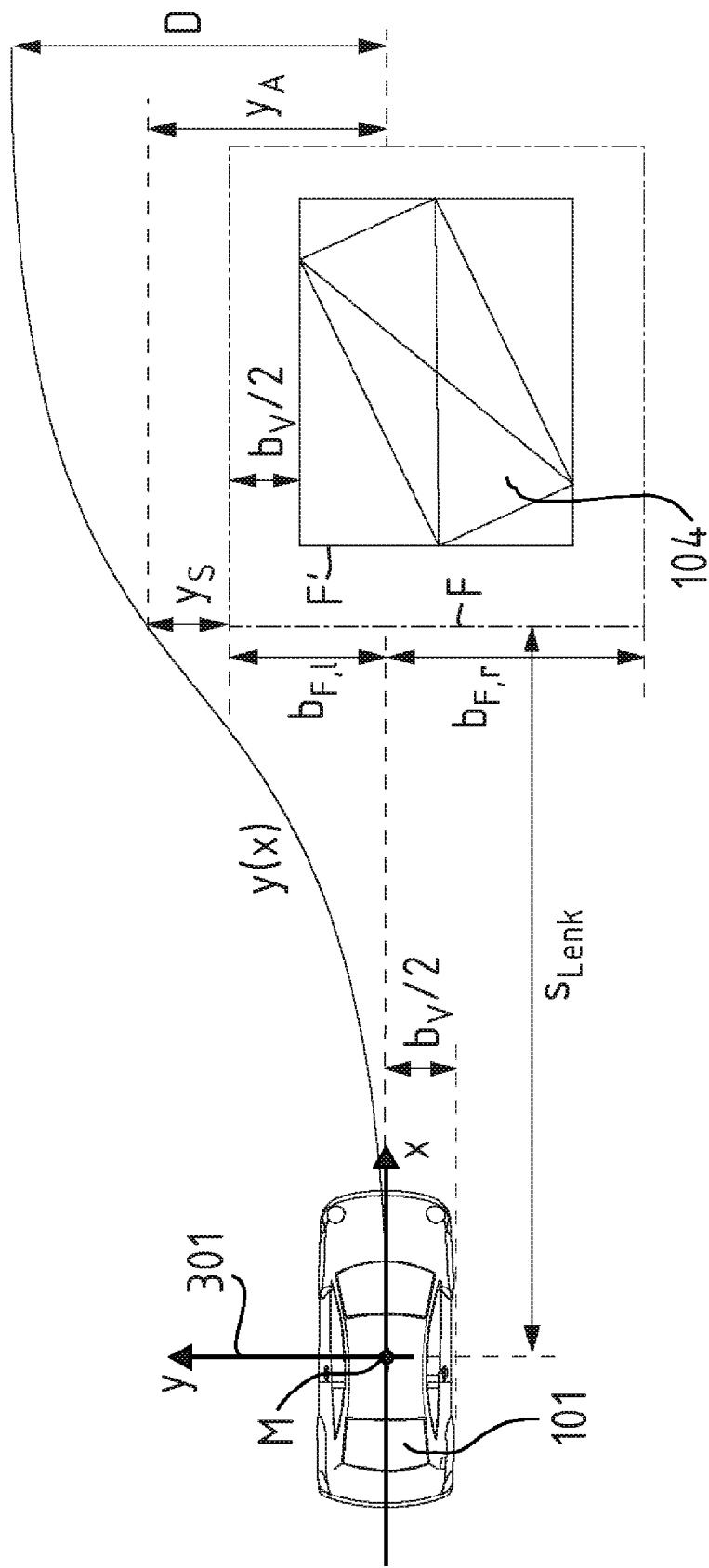
FIG. 3 is a schematic illustration of variables, which are taken into account for finding out a course of collision and for planning an avoiding path.

FIG. 3 depicts variables which are taken into account for checking whether there is a course of collision of the vehicle 101 with an object 104 for the purpose of path planning and for the determination of the start point. Furthermore, an avoiding path y(x) is illustrated, for example, on which it is possible for the vehicle 101 to avoid the object 104. The vehicle 101 is considered as a point in the calculation of the trajectory of the vehicle and in the calculation of the avoiding path. As a reference point M, it is e.g. possible to choose the central point of the vehicle or the center of gravity of the vehicle. Initially, an object front F' is defined for the object, which is oriented at right angles relative to the vehicle's longitudinal direction, and the width of which completely covers the sides of the object that face the vehicle 101. Thereafter, an object front F is made the basis for the calculation of the collision course and the avoiding path, which is enlarged by half the width of the vehicle $b_V$ to the left and the right. A collision course is assumed to exist when the trajectory of the reference point of the motor vehicle intersects the trajectory of the object front F due to the relative speed between the vehicle 101 and the object 104 and due to the course of the vehicle 101 in relation to the object 104.

The start point for a collision avoidance maneuver for the collision avoidance results from the avoiding distance $s_{steer}$. This distance is the distance that is measured in the vehicle's longitudinal direction prevailing at the start point of the collision avoidance maneuver between the start point and the point at which the lateral offset exactly corresponds to the necessary avoiding distance $y_A$. The latter distance amounts to $b_{F,l}+y_S$ in an avoiding maneuver to the left and $b_{F,r}+y_S$ in an avoiding maneuver to the right, in which case $b_{F,l}$ represents the part of the width of the object front F on the left hand of the central longitudinal axis of the vehicle, $b_{F,r}$ is the part on the right hand of the central longitudinal axis of the vehicle, and $y_S$ represents a safety distance. As can be seen in FIG. 3, the avoiding width $y_A$ is generally less than the total lateral offset D of the vehicle 101 in the collision avoidance maneuver, which is also referred to as maneuver width in the following.

Preferably, the avoiding path is plotted in a fixed system of coordinates 301, the origin of which, basically, is the reference point M of the vehicle 101 at the start of the collision avoidance maneuver, and which is fixed for the period of the collision avoidance maneuver. The positive x-axis of the system of coordinates 301 points in the vehicle's longitudinal direction existing at the start point of the collision avoidance maneuver, and the positive y-axis points to the left with regard to this direction. The following applies to the avoiding distance $s_{steer}$ in such a system of coordinates:

$$y(x=s_{steer}) = \begin{cases} b_{F,l}+y_s & \text{in an avoiding maneuver to the left } (y(x)>0 \forall x) \\ b_{F,r}+y_s & \text{in an avoiding maneuver to the right } (y(x)<0 \forall x) \end{cases}$$

Thus, the avoiding distance can be found out in a simple fashion based on the inverted function of the function indicative of the avoiding path.

Figure 4:
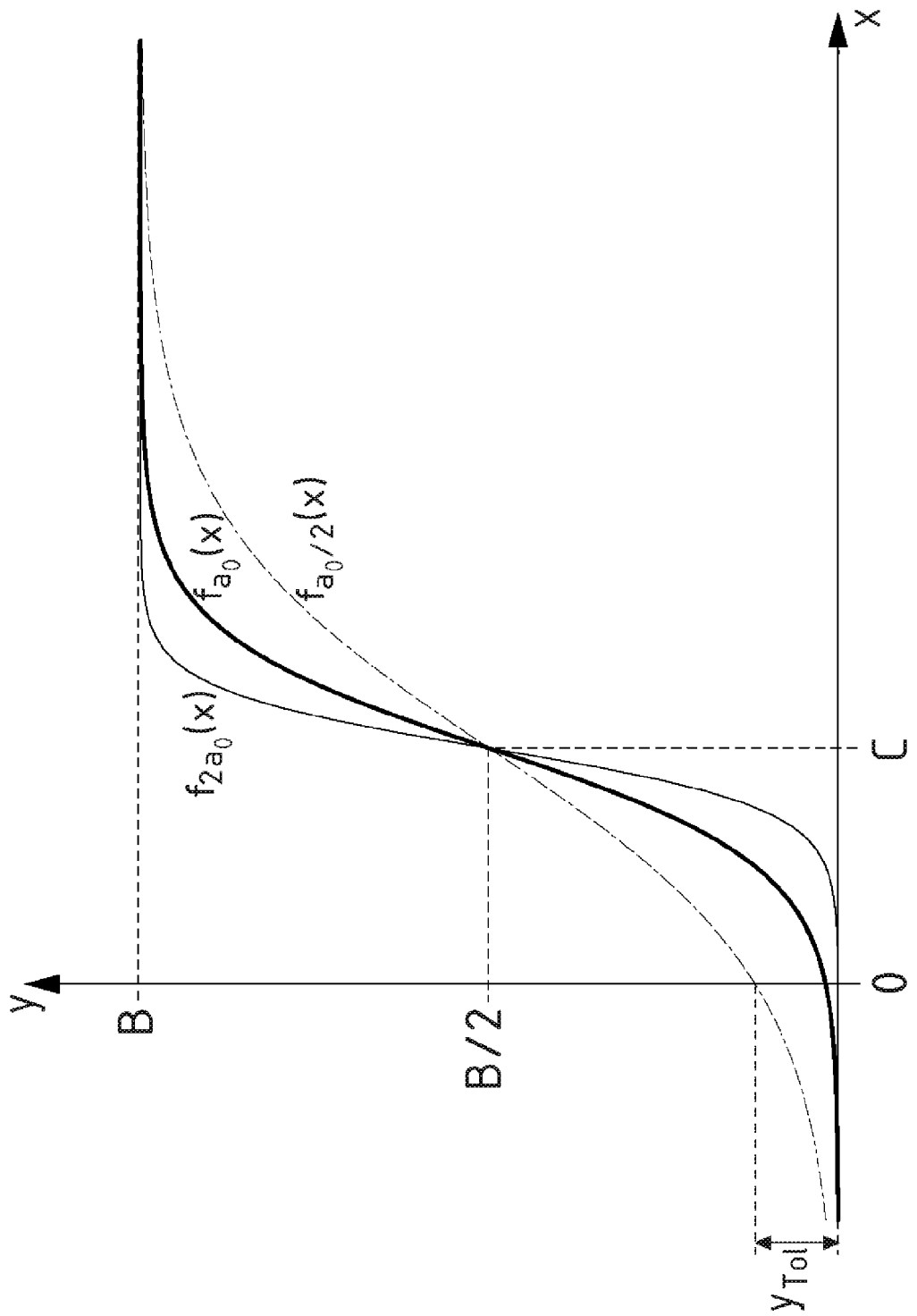
FIG. 4 is a diagram with a family of functions of a sigmoid function for several values of the parameter that determines the gradient.

The avoiding path is calculated as a so-called sigmoid function. More particularly, it has the shape of $$y = f(x) = \frac{B}{1+\exp(-a(x-c))} \quad (1)$$

in which case the variables B, a and c represent parameters of the sigmoid which have to be defined. In FIG. 4, for example, such sigmoid functions $f_{a_0}$, $f_{a_0/2}$ and $f_{2a_0}$ are represented with values of $a_0$, $2a_C$ and $a_C/2$ for the parameter a. As can also be noticed in the Figure, $$\lim_{x \to -\infty} y(x) = 0 \text{ and } \lim_{x \to \infty} y(x) = B$$

is applicable. The parameter B thus corresponds to the maneuver width, at any rate in an infinite duration of the maneuver. The parameter c corresponds to the reversing position of the function. The function value at the reversing position amounts to B/2. The sigmoid is furthermore point-symmetrical with respect to the reversing point (c,B/2), i.e. $z(\tau)=-z(-\tau)$ for $\tau=x-c$ and $z=y-B/2$. The parameter a determines the gradient of the sigmoid, in which case the gradient at the reversing point is a·B/4. It is thus discernible that higher values of a result in steeper curves.

Since the maneuver width B is realized only over the entire definition range of the sigmoid of values between $-\infty$ and $+\infty$ and the sigmoid at the origin of the system of coordinates 301 has a value other than zero, it is arranged to introduce a tolerance $y_{tol}$ with a predetermined low value. The tolerance $y_{tol}$ in FIG. 4 is illustrated as an example for the sigmoid function $f_{2a_0}$. With the tolerance $y_{tol}$ it must hold then that $$y(x=0)=y_{tol} \quad \text{(condition 1) and}$$

$$y(x=2c)=D-y_{tol} \quad \text{(condition 2)},$$

in which case D is the desired maneuver width. It follows from the combination of condition 1 and condition 2 that the parameter B corresponds to the maneuver width, i.e. that B=D applies in the event of an avoiding maneuver to the left. On account of condition 1, it will result for the parameter c in an avoiding maneuver to the left, i.e. in the positive y-direction:

$$c_{left} = \frac{1}{a}\ln\left(\frac{D}{y_{tol}} - 1\right) \tag{2}$$

The parameter a indicating the gradient of the sigmoid is determined in such a fashion that the lateral acceleration of the motor vehicle during the collision avoidance maneuver does not exceed a predetermined maximum lateral acceleration $\alpha_{y,Max}$ and that a maximum lateral jerk $\beta_{Max}$ is not exceeded.

When ignoring the sideslip angle of the motor vehicle, its yaw angle corresponds to the tangent line to the path on which the vehicle's center of gravity is moving. Thus, it holds for the yaw angle in the points along the path:

$$\psi = \arctan\frac{dy}{dx} \tag{3}$$

The lateral acceleration of the motor vehicle based on Ackermann relations results in $$a_y(x) = v\frac{d\psi}{dt} \tag{4}$$

From this equation follows:

$$a_y(x) = v\frac{d\psi}{dx}\frac{dx}{dt} \tag{5}$$

It has shown that here dx/dt=v can be set ignoring the vehicle's lateral velocity. Thus, it holds that:

$$a_y(x) = v^2\frac{d\psi}{dx} \tag{6}$$

The function $a_y(x)$ is likewise point-symmetrical with respect to the point (c,B/2). Based on the expression for $a_y(x)$ in equation (6) the absolute value of the maximum lateral acceleration irrespective of the sign can be calculated depending on the parameter a. Then, the equation $$\max_{x\in(-\infty,+\infty)} a_y(x) = a_{y,Max} \tag{7}$$

can be resolved to a in order to determine the parameter $a_{left,1}$. Here the solution is:

$$a_{left,1} = (p_0+1)^2\sqrt{\frac{a_{y,Max}}{p_0 D(v^2 p_0^2 - a_{y,Max}Dp_0 - v^2)}} \tag{8}$$

It holds that $$p_0 = s_2\sqrt{\frac{2}{s_1}\left(6v^2 + 2a_{y,Max}D + \frac{4a_{y,Max}^2 D^2}{3v^2}\right)} + \frac{2a_{y,Max}D}{3v^2} + 1 \tag{9}$$

with $$s_1 = 9v^4 + 3a_{y,Max}Dv^2 + 2a_{y,Max}^2 B^2 \tag{10}$$

$$s_2 = \cos\left(\frac{1}{3}\arctan\left(\frac{3v^2\sqrt{81v^8 + 27v^4 a_{y,Max}D^2 + 3a_{y,Max}^4 D^4}}{27v^6 + 9v^2 a_{y,Max}^2 D^2 + 4a_{y,Max}^3 D^3 + 27v^4 a_{y,Max}D}\right)\right) \tag{11}$$

It applies to the lateral jerk $\beta$—likewise with the approximation dx/dt=v:

$$\beta = \frac{da_y}{dt} = v\frac{da_y}{dx} = v^3\frac{d^2\psi}{dx^2} \tag{12}$$

By way of this term it is possible to calculate the maximum jerk occurring in the collision avoidance maneuver depending on the parameter a. Then, the equation $$\max_{x\in(-\infty,+\infty)} \beta(x) = \beta_{Max} \tag{13}$$

can be resolved to a in order to determine the value $a_{left,2}$ of the parameter a. Here it holds that:

$$a_{left,2} = \frac{1}{6v^2}\left(\sqrt[3]{s_3} + \frac{B^2\beta_{Max}^2}{\sqrt[3]{s_3}} + B\beta_{Max}\right) \tag{14}$$

with $$s_3 = \frac{\beta_{Max}}{B}\left(864v^6 + B^4\beta_{Max}^2 + 24v^3\sqrt{1296v^6 + 3B^4\beta_{Max}^2}\right) \tag{15}$$

The lower value is then used as a decisive value for the parameter a, i.e. it holds:

$$a_{left} = \min(a_{left,1}, a_{left,2}) \tag{16}$$

It is hereby ensured that both the maximum lateral acceleration and the maximum lateral jerk do not exceed the predefined values.

In an avoiding maneuver to the right, it holds for the parameters of the sigmoid:

$$B_{right} = -D$$

$$c_{right} = c_{left}$$

$$a_{right} = a_{left} \qquad (17)$$

As has been depicted hereinabove, the parameters of the sigmoid are determined depending on the vehicle speed, the desired maneuver width, a predetermined maximum lateral acceleration and a predetermined maximum lateral jerk. The vehicle speed is determined e.g. in the fashion known to the expert in the art based on the signals of wheel rotational speed sensors. With respect to the desired maneuver width, it is possible to choose various strategies:

1) Calculation of the 'optimal maneuver width': The maneuver width corresponds herein to the avoiding width $y_A$, i.e. the lateral offset which is exactly required for avoiding. This strategy is advantageous because the smallest possible maneuver width is used. The avoiding distance amounts to 2c in this case.
2) Avoiding maneuver into the middle of the adjacent lane: The maneuver width is herein calculated in such a way that the vehicle will be in the middle of the adjoining lane after the collision avoidance maneuver. Due to lane detection, which can be executed e.g. using a video sensor, the position of the vehicle within the present lane is determined in addition to the lane width of the current and the adjacent lane. The advantage of this strategy is the behavior of the vehicle during an automatic emergency avoidance maneuver which is easy to reconstruct for the driver.
3) Avoiding maneuver to the edge of the current lane: In this case the maneuver width is defined in such a fashion that the vehicle in the avoiding maneuver is moving to the edge of its present lane without leaving it. To this end, lane width and present position of the vehicle within the lane are determined e.g. by way of the video sensor. The maneuver width is then determined from this data. However, it is only possible to choose this strategy when there is sufficient space in the lane for the collision avoidance maneuver, i.e. when the maneuver width determined at least corresponds to the required lateral offset.

The maximum lateral acceleration takes influence on the 'roughness' of the steering intervention and the avoiding distance. Low values cause large avoiding distances and smooth collision avoidance maneuvers. In contrast thereto, high values cause short avoiding distances but rough steering interventions. In the embodiment in which the steering torque is applied to the steering handle, it is favorable to intervene into the steering system already at an early time and in a smooth way so that the driver can better follow the steering recommendations. Therefore a lower value of the maximum lateral acceleration is preferred in this case. When the steering motions are performed by means of a steering actuator, high values of the maximum lateral acceleration are preferred in order to start the steering intervention at the latest possible moment, thus allowing the driver to intervene independently for as long as possible.

The maximum lateral jerk is limited especially by the maximum possible regulating speed $\dot{\delta}_{H,Max}$ of the steering actuator. In this case, $$\beta_{Max} = \frac{v^2}{l \cdot i_H} \dot{\delta}_{H,Max'} \qquad (18)$$

applies, where v designates the vehicle speed, l designates the wheel base of the vehicle and $i_H$ the transmission factor with which the steering actuator grips through to the steerable wheels. Equally, the maximum jerk can also be prescribed by a constant value.

Preferably, a control method is used to drive the steering actuator by means of the steering actuator controlling arrangement 208, in which method the control is executed by way of a state feedback. It has shown that the avoiding path is robust vis-à-vis a large number of methods for cruise control so that a large number of control methods can be employed. For example, a flatness-based cruise control has proven favorable as described in R. Rothfuβ et al, 'Flatness: A new access to the control and regulation of non-linear systems', automation systems, 45 (1997), pages 517-525, for a parking maneuver.

The invention claimed is:

1. A method for executing a collision avoidance maneuver of a motor vehicle, the method comprising:
   detecting an object (104) in the surroundings of the vehicle (101) with which the motor vehicle (101) is on a collision course;
   determining a path for the collision avoidance maneuver of the motor vehicle (101), wherein if the path is given by a sigmoid, the shape of which is determined by at least one parameter (B; a; c), with the parameter (B; a; c) being established dependent on at least one of a speed (v) of the motor vehicle and a desired maneuver width (D) of the collision avoidance maneuver;
   determining a start point at which the collision avoidance maneuver is started depending on the path established; and
   influencing a steering system of the motor vehicle (101) depending on the path established after the motor vehicle (101) has reached the start point, wherein in an avoiding maneuver to the left in the vehicle's longitudinal direction, $$B = D$$

$$c = \frac{1}{a} \ln\left(\frac{D}{y_{tol}} - 1\right)$$

applies to the parameters, where D is the maneuver width of the collision avoidance maneuver and $y_{tol}$ designates a predetermined tolerance.

2. The method as claimed in claim 1, wherein a parameter (a) determining a gradient of the sigmoid is determined depending additionally on a speed (v) of the motor vehicle (101) in such a fashion that a lateral acceleration (ay) of the motor vehicle (101) which occurs in the collision avoidance maneuver does not exceed a predetermined maximum value (ay, Max).

3. The method as claimed in claim 1, wherein the parameter of the sigmoid determining the gradient of the sigmoid is determined depending on the speed (v) of the motor vehicle (101) in such a manner that a maximum lateral jerk (β) that occurs in the collision avoidance maneuver does not exceed a predetermined maximum value ($\beta_{Max}$).

4. The method as claimed in claim 1, wherein the sigmoid is given by $$y(x) = \frac{B}{1 + \exp(-a \cdot (x - c))}$$

where y(x) is a lateral offset of the motor vehicle and x is the distance to be covered in a longitudinal direction in a system of coordinates (301), the origin of which is basically identical with the start point of the collision avoidance maneuver and the positive x-direction of which points in the vehicle's longitudinal direction that prevails at the start point, in which case a is the parameter determining the gradient of the sigmoid, and B and c are additional parameters determining the shape of the sigmoid.

5. The method as claimed in claim 1, wherein the maneuver width (D) is found out depending on the width of the front of an object (F; F') facing the motor vehicle (101).

6. The method as claimed in claim 1, wherein the maneuver width(D) is determined in such a manner that the motor vehicle (101) is steered from a present lane into the middle of an adjacent lane in the collision avoidance maneuver.

7. A method for executing a collision avoidance maneuver of a motor vehicle, the method comprising:

detecting an object (104) in the surroundings of the vehicle (101) with which the motor vehicle (101) is on a collision course;

determining a path for the collision avoidance maneuver of the motor vehicle (101), wherein if the path is given by a sigmoid, the shape of which is determined by at least one parameter (B; a; c), with the parameter (B; a; c) being established dependent on at least one of a speed (v) of the motor vehicle and a desired maneuver width (D) of the collision avoidance maneuver;

determining a start point at which the collision avoidance maneuver is started depending on the path established; and influencing a steering system of the motor vehicle (101) depending on the path established after the motor vehicle (101) has reached the start point, wherein an avoiding maneuver to the right in the vehicle's longitudinal direction, $$B = -D$$
$$c = \frac{1}{a}\ln\left(\frac{D}{y_{tol}} - 1\right)$$

applies to the parameters, where D designates the maneuver width of the collision avoidance maneuver and $y_{tol}$ is a predetermined tolerance.

* * * * *